Patented Oct. 30, 1951

2,573,495

UNITED STATES PATENT OFFICE 2,573,495

SEPARATION OF MALEIC ANHYDRIDE-OLEFIN MONOMERS FROM POLYMERS

John Ross, Ramsey, and Arthur I. Gebhart, Union, N. J., assignors to Colgate-Palmolive-Peet Company, Jersey City, N. J., a corporation of Delaware No Drawing. Application March 6, 1948, Serial No. 13,516

2 Claims. (Cl. 260—485)

This invention relates to a process for separating simple addition condensation products from mixtures containing higher polymeric condensation products, and more particularly to a novel process for purifying such simple mono-addition condensation products by the removal of complex polymers and the like diluent products.

The prior art has described methods for condensing olefins with aliphatic acids or anhydrides having the alpha-beta-enal grouping —C=C—CO to form alkenyl-substituted carboxylic acids, but the methods disclosed produce a mixture of simple and polymeric condensation products. Such mixtures are usually complex and difficult to separate into their components. In gentral, isolation of the individual components was not even attempted heretofore, and the entire mixture was employed as produced or a rough fraction taken by distillation, or the mixture neutralized with a lye solution or the like to form a mixture of salts.

One of the attendant disadvantages of the presence of polymeric and similar undesirable diluents in simple condensation products is their tendency to darken the mixture. This is especially noticeable when working with compounds of moderately high molecular weight or under high temperature conditions or both. The resultant reaction mass is usually dark brown in color and sometimes almost black. There is also a tendency toward increased viscosity which is quite undesirable for certain purposes. Moreover, even when the diluent material in the simple condensation product is light in color, its inherent modifying effects on the properties of the simple condensation product are in most cases objectionable.

It is an object of the present invention to provide a novel process for purifying simple or mono-addition condensation products resulting from the condensation of olefinic compounds with olefinic acids or anhydrides.

It is also an object of this invention to provide a new method for removing polymeric condensation products from mixtures of the simple and polymeric products resulting from the condensation of unconjugated olefinic compounds with aliphatic acids or anhydrides having the alpha-beta-enal grouping —C=C—CO.

It is another object of this invention to provide a novel method of treating olefinic condensation products of the character described to remove undesirable color-imparting bodies or diluents which may be present or are formed during the condensation reaction.

It is still another object of the invention to provide a new process for separating simple addition products and derivatives thereof from mixtures containing more complex polymeric products after condensing maleic anhydride with an olefin.

Other objects and advantages of this invention will be apparent from the following description.

Briefly, the invention is based upon the discovery that polymeric condensation products, which are formed along with the simple addition products upon condensing olefinic compounds with aliphatic acids or anhydrides having the alpha-beta-enal grouping, are not esterified to any appreciable extent under esterifying conditions which readily esterify the simple condensation products. As a result the polymeric condensation products, which are still acidic in nature, may be neutralized by the addition of suitable alkali to form salts which dissolve in the aqueous phase, and thus can be drawn off leaving the esterified simple condensation products as an insoluble phase.

According to the present invention, a mixture containing simple and polymeric condensation products, such as produced by the condensation of an olefinic compound with an olefinic acid or anhydride, having the alpha-beta-enal grouping, as aforementioned, is subjected to esterification and the resultant ester mixture washed with a dilute aqueous alkaline solution to remove unesterified material. A solution containing from 2% to about 5% by weight of sodium or potassium carbonate or dilute sodium or potassium hydroxide solution or the like may be used for this purpose, sufficient alkali solution being added to neutralize all of the acidic material present. The thus neutralized acidic material dissolves in the aqueous phase which separates from the oily non-aqueous phase comprising the esterified simple reaction products. After separation of the polymeric reaction products, which in the form of their salts remain dissolved in the aqueous phase and are drawn off, the ester material may be washed to remove alkali and recovered in any suitable manner, viz. by distillation, preferably under reduced pressure.

In general, the methods employed, as disclosed in the prior art for producing these olefinic condensation products, are known to result in the formation of simple mono-addition products together with higher polymeric compounds. To our knowledge however, it has not been known or appreciated heretofore that these higher polymeric compounds would not readily esterify, and thus could be separated from the simple condensation compounds which are easily esterified. Some effort has been made, heretofore, toward controlling the reaction so that lesser amounts of the polymeric products are formed, particularly those which undesirably darken or otherwise alter the color or other properties of the final product. But even when only small amounts of the polymeric condensation products are present, the process of this invention may be used advantageously.

A theory advanced in explanation of the formation of the simple or mono-addition products of the reaction suggests that the condensation results in attachment of the olefin to the unsaturated acid or anhydride through one of the doubly-bonded carbons of each compound, with elimination of the double bond of the unsaturated acid or anhydride and progression of the double bond of the olefin to an adjacent carbon. Thus, according to this theory, the condensation of hexadecene-1 and maleic anhydride to form the simple addition product may be illustrated as follows:

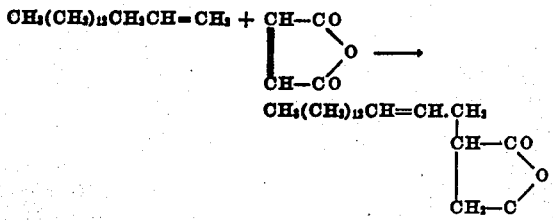

It has also been found, as heretofore explained, that the simple mono-addition products thus produced are readily esterified, whereas on the contrary, the polymeric reaction products are esterified with great difficulty, if at all. For this reason, the dark colored or polymeric reaction products, being still acidic after esterification of the simple condensation products, pass readily into solution upon washing the reaction mixture with weak alkalies. Inasmuch as the esters of the simple condensation products and any esters of unreacted starting materials are neutral bodies and substantially insoluble in dilute alkali, they form a distinct and separate layer over the aqueous layer and thus may be readily separated therefrom by decantation, settling, extraction, centrifugation or the like. The esterification may be carried out by heating the reaction mixture with an excess of a lower alcohol, such as methanol or ethanol, in the presence of an esterification catalyst (e. g., sulphuric acid).

After esterification of the simple reaction products, the mixture is washed with a dilute aqueous alkaline solution, such as described, to remove the polymeric and other diluent unesterified acidic substances. This washing step may be carried out as a batch operation in one or more treatments in a suitable vessel and the aqueous solution containing the polymeric products removed as aforesaid; or the washing may be carried out as a continuous operation in a single vessel, or in a series of vessels, by continuously removing the esterified simple reaction products at the top of the vessel and the aqueous solution of the polymeric products at the bottom of the vessel. Thereafter, any solvent employed is removed by distillation or evaporation from the ester phase, and then, if desired, the light-colored mixture of esters may be subjected to fractional distillation. Any unreacted starting materials or the esters of these materials come over first and are followed by the esters of the simple condensation product, being substantially devoid of polymeric contaminants.

The olefins employed in the condensation may be aliphatic or alicyclic. They may have straight or branched chains, and they may be mono-olefins or non-conjugated polyolefins. Further, the olefins treated may be unsubstituted or they may bear non-reactive substituent groups, including halogen, ether, alkyl and aryl groups. In general, it is preferred to employ olefins having about 8 to about 24 carbons per molecule, and aliphatic olefins of about 16 carbons have given particularly satisfactory results. Suitable olefins and olefin derivatives include decene, dodecene, tri-isobutylene, hexadecene, docosene, 6,9-pentadecadiene, cyclopentenes and the like.

These olefinic materials may be condensed with compounds containing characteristic grouping —C=C—CO in the molecule. Such compounds are preferably aliphatic and contain up to about seven carbon atoms per molecule. Examples are maleic or fumaric acid, crotonic acid, etc., and their homologs, analogs, esters, anhydrides and amides, etc.

In accordance with this invention it has been found that the original condensation may be directed so that a substantially higher proportion of the simple addition products to polymeric products is produced. This may be effected by mixing the olefinic material and the olefinic acid or anhydride in approximately stoichiometric proportions and in the substantial absence of peroxides. While it may be preferred to carry out the condensation under such conditions, it will be understood that the present process contemplates the separation of the simple reaction products from the polymeric products resulting from whatever method of condensation is employed and in whatever proportion these products may occur. After esterification and isolation of the esters of the simple condensation products, the corresponding free acids may be obtained by heating the esters with suitable alkali. If desired, adjuvant materials may be admixed with the simple condensation product, free acid or ester. Thus, fillers, builders, dyestuffs, solvents, etc. may be added thereto, depending upon the ultimate use of the material.

The following examples are illustrative of the present invention, but it will be understood that the invention is not limited thereto. Unless otherwise stated the parts mentioned in the examples mean parts by weight.

*Example I*

About 120 parts of methyl oleate is heated with 40 parts of maleic anhydride under reflux and in an atmosphere of nitrogen. The temperature is rapidly raised to about 215° C., and the heating is continued for about ninety minutes, the temperature rising to approximately 235° C. The mixture is then cooled, and about 200 parts of methyl alcohol and one part of concentrated sulphuric acid are introduced. This mixture is again heated under reflux to accelerate the esterification of the simple condensation products, and the esterified mixture is thereafter washed with sufficient dilute (3%) aqueous solution of sodium carbonate to neutralize all acidic materials. After vigorous agitation, the mixture is allowed to settle, and the brown colored aqueous layer is withdrawn. The ester layer which is substantially colorless is then transferred to a Claisen flask and, after removing methanol, is vacuum distilled at 2 mm. pressure. About 72 parts of a fraction boiling between 230° C. and 235° C. at this pressure is recovered and redistilled, boiling at 212 to 215° C. at 1 mm. pressure. The redistilled ester is a colorless, odorless, mobile liquid having an iodine value of 58.2, as compared with a theoretical value of 57.8 for the simple, mono-addition condensation product.

*Example II*

About 180 parts of hexadecene-1 and 80 parts of maleic anhydride are mixed and heated under reflux and in a nitrogen atmosphere as in Example I. The temperature is rapidly raised to about 194° C. and heating is continued for three hours, the temperature gradually rising to 222° C. The resulting reaction mixture, which is a clear light brown viscous liquid, is cooled in a stream of nitrogen and about 680 parts of methanol containing 0.5% concentrated sulphuric acid added. This mixture is then refluxed to convert the simple addition products to the methyl esters, and the resultant esters are taken up in ether. A dilute (3%) aqueous solution of potassium carbonate is added and the mixture thoroughly agitated, after which the aqueous layer is withdrawn. About 110 parts of unesterified acids are subsequently recovered from this aqueous solution as a brown brittle resin. Retreatment of the resin with methyl alcohol and sulphuric acid does not esterify these acids.

The ether phase containing the esters of the simple addition products is warmed to remove the ether, and the esters are then distilled at a pressure of 1 millimeter of mercury. Fractions comprising methyl maleate and unreacted hexadecene are first recovered, and the condensation product ester then comes over at 186° C. to 190° C. This ester fraction is colorless and odorless, has a saponification equivalent of 185 as compared with the calculated theoretical 184, and has an iodine value of 69.0 as compared with a theoretical value of 69.2 for the hexadecene-maleic anhydride mono-addition condensation product.

Where the acid corresponding to the ester is desired the methyl ester product recovered is saponified with alcoholic KOH, and the resultant acid purified by crystallization from a suitable solvent, such as petroleum ether, acetone or the like.

*Example III*

A mixture of 56 parts of hexadecene-1 and 22 parts of crotonic acid is heated at about 195° C. under ordinary atmospheric pressure for two hours. The resulting reaction product is cooled and, after adding methanol and sulphuric acid, refluxed to convert the simple condensation products to their methyl esters. Thereafter the esterified mixture is thoroughly washed with a dilute aqueous solution of sodium carbonate, as described in Example I, and the aqueous phase withdrawn. The remaining ester portion is transferred to a Claisen flask and distilled under a pressure of one millimeter of mercury. Approximately nine parts of a condensation product boiling from 125° to 140° C., and representing the ester of the simple condensation addition product, is recovered. The esters recovered, if desired, may be reconverted to the corresponding acids by alcoholic saponification and crystallization from a suitable solvent, as described in Example II.

The esters of the simple condensation products, and obtained in relatively pure form by the process of this invention, are substantially insoluble in water and are useful as solvents, plasticizers, paint vehicles, etc. They may be used in the preparation of other organic compounds and may be further condensed to produce resinous products. The esters may also be used in the production of waxes, polishes, flotation agents, rubber compounding materials and the like. Further, if desired the esters of these simple condensation products may be saponified and converted to their alkali salts, ammonium salts or the like, which salts have surface active properties and may be used as foaming, wetting, emulsifying and deterging agents.

Although the present invention has been described with respect to particular embodiments and examples, it is to be understood that it is not desired to be limited to the exact details of the process described in the examples, for obvious modifications will occur to a person skilled in the art.

What is claimed is:

1. The process of recovering esterifiable monomeric condensation products from a reaction mixture containing monomeric and polymeric alkenyl-substituted carboxylic acid derivative condensation products which comprises subjecting the reaction mixture to esterification with an excess of lower monohydric alcohol to completely esterify the acid groups of the monomeric condensation products present while bringing about no appreciable esterification of the polymeric condensation products, treating the resultant ester mixture with an aqueous alkaline solution to neutralize and dissolve the unesterified polymeric condensation products while leaving the esters as a separate insoluble phase, and separating the aqueous solution from said ester phase to recover the esterified monomeric condensation products.

2. The process of recovering esterifiable monomeric condensation products from a reaction mixture containing monomeric and polymeric condensation products resulting from the reaction of an olefinic compound with a compound containing the characteristic grouping $$-C=C-CO$$

selected from the groups consisting of unsaturated aliphatic dicarboxylic acids and anhydrides, which comprises subjecting the reaction mixture to esterification with an excess of lower monohydric alcohols to completely esterify the acid group of monomeric condensation products present while bringing about no appreciable esterification of the polymeric condensation products, treating the resultant ester mixture with an aqueous alkaline solution to neutralize and dissolve the unesterified polymeric condensation products while leaving the esters as a separate insoluble phase, and separating the aqueous solution from said ester phase to recover the esterified monomeric condensation products.

JOHN ROSS.
ARTHUR I. GEBHART.

REFERENCES CITED

The following references are of record in the file of this patent:

UNITED STATES PATENTS

| Number | Name | Date |
|---|---|---|
| 2,165,450 | Burke | July 11, 1939 |
| 2,294,259 | Peski | Aug. 25, 1942 |